United States Patent [19]

Farrell et al.

[11] E Re. 30,729

[45] Reissued Sep. 1, 1981

[54] FLOATAGE COLLECTING APPARATUS AND METHOD

[75] Inventors: James H. Farrell; Ralph A. Bianchi, both of Lexington; Edward E. Johanson, Andover, all of Mass.

[73] Assignee: JBF Scientific Corporation, Wilmington, Mass.

[21] Appl. No.: 910,513

[22] Filed: May 30, 1978

Related U.S. Patent Documents

Reissue of:

[64] Patent No.: 3,804,251
Issued: Apr. 16, 1974
Appl. No.: 231,977
Filed: Mar. 6, 1972

U.S. Applications:

[63] Continuation of Ser. No. 767,833, Feb. 11, 1977, abandoned, and a continuation-in-part of Ser. No. 151,838, Jun. 10, 1971, abandoned.

[51] Int. Cl.[3] ..... B01D 21/00

[52] U.S. Cl. ..... 210/801; 210/242.3; 210/526; 210/923

[58] Field of Search ..... 210/83, 242 S, DIG. 25, 210/DIG. 26, 400, 401, 523, 526, 923, 801

[56] References Cited

U.S. PATENT DOCUMENTS

| | | | |
|---|---|---|---|
| 3,314,540 | 4/1967 | Lane | 210/242 S |
| 3,314,545 | 4/1967 | Grabbe et al. | 210/401 |
| 3,615,017 | 10/1971 | Valdespino | 210/242 S |
| 3,617,555 | 11/1971 | Ginsburgh | 210/523 |
| 3,617,556 | 11/1971 | Cole | 210/523 |
| 3,637,080 | 1/1972 | Martel | 210/242 S |
| 3,662,892 | 5/1972 | Sorensen | 210/242 S |
| 3,670,896 | 6/1972 | Hale, Jr. et al. | 210/242 S |
| 3,715,034 | 2/1973 | Ivanoff | 210/242 S |
| 3,804,251 | 4/1974 | Farrell et al. | 210/242 S |

FOREIGN PATENT DOCUMENTS

| | | | |
|---|---|---|---|
| 447963 | 11/1967 | Switzerland | 210/242 |
| 1131513 | 10/1968 | United Kingdom | 210/DIG. 21 |

*Primary Examiner*—Theodore A. Granger
*Attorney, Agent, or Firm*—Kenway & Jenney

[57] ABSTRACT

Apparatus and method for removing floating material from the surface of a body of liquid and for collecting the material has an endless belt-type materials transport mounted, as by rollers with vertically-separated horizontal rotation axes, to dispose the transport with a lower flight inclined downwardly from above the liquid surface at a frontal location to below the surface at a rearward location. A collection well is contiguously behind the rearward location. The transport is driven to advance the lower flight in the direction from the frontal location to the rearward location. This motion carries floating material from the liquid surface downward and rearward under the lower flight of the transport and releases it at the rearward location to float upward into the collection well. A method for floatage collection by steps that the foregoing apparatus performs is also disclosed.

27 Claims, 8 Drawing Figures

FLOATAGE COLLECTING APPARATUS AND METHOD

Matter enclosed in heavy brackets [ ] appears in the original patent but forms no part of this reissue specification; matter printed in italics indicates the additions made by reissue.

BACKGROUND

*This is a continuation of application Ser. No. 767,833, filed Feb. 11, 1977 and now abandoned.* This application is a continuation-in-part of the copending and now abandoned U.S. Pat. application Ser. No. 151,838 filed June 10, 1971 and entitled "Floatage Collecting Apparatus."

This invention relates to apparatus for removing floating material from the surface of a body of liquid and for collecting it. More particularly, the invention provides equipment for removing oil, oil-sorbents and other floating material from, for example, an open body of water by means of an endless material transport that moves relative to the water in such a way as to trap substantially whatever volume of both liquid and solid floatage which is present. The equipment is typically deployed on a barge-like or other floating craft, and used for cleaning floatage from a body of water such as a harbor or beach area. The invention will accordingly be described in this context, although it provides advantages which can be used in other environments.

Prior floatage removing equipment employing endless belt transports, such as those described in U.S. Pat. Nos. 3,314,540 and 3,314,545, are considered by their design to have a limited capacity to collect floatage of both solid and liquid forms. In particular, some prior constructions depend on adherence of the floatage to the belt transport to recover the floating material. Others provide structures that push the floatage to recover it, and others require pumps to collect the floating material. Still others tend at least partially to bulldoze the floating material being recovered in front of them, which increases the likelihood that some floatage will be pushed to the side and hence not collected.

Also, a prior skimming type of floatage recovery equipment has a submerged forward lip or shelf edge and processes all material, whether floatage to be removed or the liquid being skimmed, which is above the shelf edge. Similarly, this skimming type of recovering equipment takes in only the floatage which is above the shelf edge, and hence leaves floatage uncollected where there is a considerable depth of floatage.

Accordingly, it is an object of this invention to provide equipment for removing floating material from a body of water and which recovers essentially all floatage in its path. Another object of the invention is to provide equipment of the above character which does not significantly bulldoze or otherwise push floatage ahead of it as it moves on the body of water, and further which is capable of collecting essentially the entire thickness of floatage in its path.

It is also an object of the invention to provide equipment of the above character which is capable of collecting liquid floatage, sorbents for liquid floatage, and many forms of solid floatage.

A more specific object of the invention is to provide equipment of the above character that collects and that retains significantly more floatage which it engages under a declined belt than prior equipment.

A further object of the invention is to provide equipment of the above character which is relatively simple in construction and operation.

Another object of this invention is to provide a method for collecting from a body of water essentially all floatage that can be brought into the path of skimming-type floatage recovering apparatus.

It is also an object to provide a floatage recovery method having the foregoing advantages and which collects both liquid and solid floatage, and which can be practiced on a surface craft moving in the body of water.

Other objects of the invention will in part be obvious and will in part appear hereinafter.

GENERAL DESCRIPTION

Floatage recovery equipment embodying the invention and for clearing a body of water incorporates a surface craft, e.g., a boat, carrying an endless belt which rollers support to dispose the belt with a lower flight passing downwardly and rearwardly from a forward roller location above the water's surface to a further roller surface below the water surface. Thus, the lower flight of the materials-transporting belt forms a downwardly and forwardly facing inclined surface which is openly exposed to the water at the bow of the craft. A well-like open-bottomed enclosure is on the craft adjacently behind the aft end of the belt lower flight.

A drive mechanism moves the belt to advance the lower flight from the forward roller to the rearward and lower submerged roller surface. This motion carries floatage in the path of the craft downward with the belt lower flight. It is understood that this occurs because hydrostatic and hydrodynamic pressures tend to urge the floatage against the belt. At the submerged aft roller surface, the belt turns upward, discharging the floatage trapped under it into the enclosure. Water which enters the enclosure passes out through the open bottom.

The belt-carrying craft preferably has hull walls extending along both sides of the belt lower flight to preclude the sideways flow of material out from under the belt. Also, the materials-transporting belt can carry cleat-members to enhance its engagement with floatage trapped under the lower flight. Further, the materials transport can be pervious or cleated. For example, the belt can have large perforations through it, forming floatage-engaging pockets, and the lower flight of this perforated belt can slide under a stationary platform that blocks leakage of trapped floatage. Transport-cleaning devices such as scrapers, squeegees, rollers and brushes preferably engage the materials transport in the well to remove floatage which adheres to the belt.

Further in accordance with the invention, the well bottom preferably is fitted with a baffle structure. The baffle precludes turbulent currents from drawing collected floatage out of the well. However, floatage enters the well through the baffle, and water leaves the well through the baffle. More particularly, at the aft end of the conveyor lower flight, floatage under the conveyor is free to rise due to its buoyancy. This floatage rises into the collection well both through openings which are located in front of the baffle and which are within the baffle structure.

As floatage accumulates in the well, which is initially filled with water, it displaces the water. The displaced water automatically exits from the well through the baffle. As a result, no significant pressure head developes in the collection well as it fills with floatage, so that additional floatage rises into it as easily as the first increments of floatage. Through all of this operation, the baffle restricts currents from entering the well and carrying out floatage.

In addition to providing a baffle at the well bottom, the invention provides an optional plate spaced below the baffle to diminish still further the passage of turbulent currents through the collection well. As one specific, this plate ensures that the collection well is isolated from currents that arise when the craft maneuvers, such as turning, especially sharply.

The invention accordingly comprises the features of construction, combinations of elements, and arrangement of parts exemplified in the constructions hereinafter set forth, and the several steps and the relation of one or more of such steps with respect to each of the others exemplified in the method hereinafter disclosed, and the scope of the invention is indicated in the claims.

BRIEF DESCRIPTION OF DRAWINGS

For a fuller understanding of the nature and objects of the invention, reference should be had to the following detailed description taken in connection with the accompanying drawings, in which.

DESCRIPTION OF ILLUSTRATED EMBODIMENTS

Figure 1:
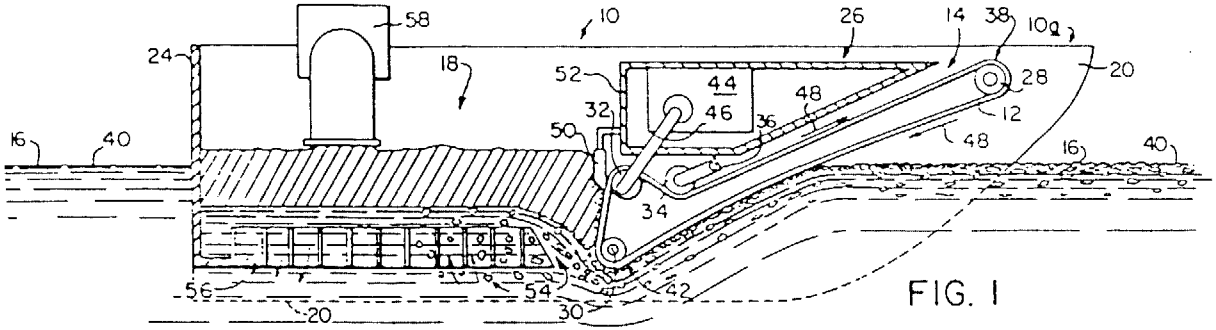
FIGS. 1 and 2 are, respectively, side elevation and top plan views, partly broken away, of a floatage recovering and collecting vessel embodying features of the invention.
Figure 2:
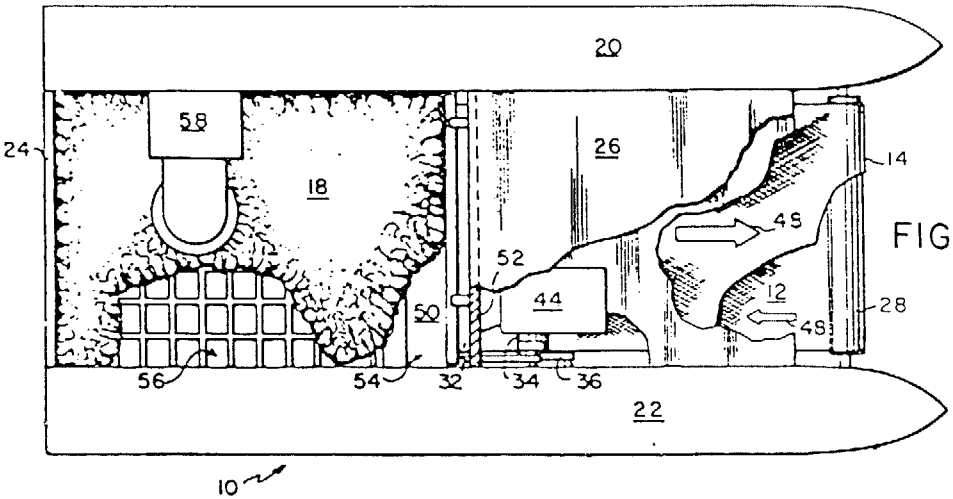

FIGS. 1 and 2 show a boat 10 having a downwardly inclined flight 12 of a materials transport 14 openly exposed to the water adjacent the bow 10a for removing floatage 16 from the water surface and collecting it in a storage well 18. The illustrated boat 10 has side-by-side floats 20 and 22 joined together by a stern wall 24 and a mid-ship structure 26 to form a catamaran-type hull. The transport 14 is a continuous, endless belt trained over rollers 28 and 30, a driving roller 32 and a tensioning roller 34. The rollers have parallel rotation axes which are horizontal and extend transverse to the bow-stern dimension of the boat. Rollers 28, 30 and 32 are journaled to the inner sides of the hull floats and span the width between these floats. The tensioning roller 34 is similarly disposed but is mounted by way of moment arms 36, 36; each of which is pivotally secured to a hull float at a point horizontally removed from its rotational mounting of the roller 34 shaft.

The roller 28 is at an upper, forward location 38 on the boat 10 near the bow and well above the water line 40 so that waves likely to be encountered during floatage-recovering operation do not spill over it. The roller 30 is at a lower location 42 spaced sternward and below the location 38 to be continually below the water line 40 during floatage-recovering operation. A straight construction line tangent to the lower surfaces of both rollers 28 and 30 is thus inclined downward from location 38 to location 42; the angle of the incline relative to the horizontal typically and preferably is between 10° and 35°. Other angles generally within the range between 5° and 45° can however be used; generally the more buoyant the floatage being recovered, the shallower the desired angle. The belt transport 14 passes outwardly around the rollers 28 and 30 to form the lower flight 12 substantially along this common tangent line. The belt transport also passes outwardly around the drive roller 32, which is above the location 30 and preferably above the water line 40; the illustrated drive roller is slightly forward of the roller 30. The tensioning roller 34 rides over the upper flight of the belt transport as it passes between the drive roller 32 and the forward roller 28.

The continuous belt which forms the illustrated materials transport 14 is substantially impervious to whatever liquids or other materials which are to be recovered. By way of example, for recovering oil and whatever solid debris is present, the transport can be of woven or extruded construction, or a laminate of both forms of constructions.

[As] *A* drive mechanism 44, typically including a motor with a gear reducer, is coupled by a drive linkage 46 to roller 32. The mechanism drives this roller clockwise, as seen in FIG. 1, so that the belt transport moves in the direction shown with arrows 48 to advance the lower flight 12 from roller 28 to roller 30.

As also shown in FIGS. 1 and 2, an optional belt cleaner 50, illustratively in the form of a scraper, is mounted on the mid-ship structure 26 to remove material which adheres to the belt transport as it travels between rollers 30 and 32.

The inner walls of the hull floats 22 and the stern wall 24 form three peripheral sides of the storage well 18. These walls extend from above the water line 40 to at least the lowest surface of roller 30, and hence to the lowest point along the transport lower flight 12. The back wall 52 of the mid-ship structure 26, and the length of belt transport 14 between rollers 30 and 32, form the remaining, frontmost, peripheral wall of the well 18. *As also shown, the top of the well is open to the pressure of the atmosphere so that no significant pressure head develops in it as noted above.* The well bottom has an unobstructed opening 54 at the forward portion thereof, contiguously behind roller 30. A baffle 56 for suppressing turbulent fluid flow extends along at least the greater portion of the rest of the well bottom, with the remaining portions being closed solid or open to fluid flow, as desired. The lower surface of the baffle preferably is planar, and it is at, or at least close to, the same horizontal level as the lowest point of the transport flight 12. This arrangement minimizes turbulence between the front end of baffle and the location 42, and enhances entry of floatage into the well. Thus, the baffle 56 is characterized, at least in part, as being perforate and horizontally disposed at a selected level relative to the level of the transport at the lower location 42. Although not shown, the boat 10 can have whatever ballast and whatever propelling equipment is desired; these being provided according to conventional techniques.

The floatage recovering craft 10 operates by drawing floatage down the lower flight of the belt transport 14 and then releasing it in the collecting well 18. A pump 58 on the craft pumps the collected floatage from the well into further storage as desired. More specifically, forward motion of the craft 10 pushes floatage which engages the transport lower flight 12 slightly under the water line 40. The floatage then exerts pressure against the transport. This pressure enables the transport to carry the floatage further under the water line 40 and along the transport as it is driven rearward to the lower roller 30. Thus, a combination of hydrodynamic and hydrostatic pressures are understood to hold floatage against the transport lower flight 12, so that the floatage moves with the transport as it travels from the forward upper roller 28 to the lower roller 30. The drive mechanism 44 generally drives the transport 14 at a speed that depends in part on the travel speed of the craft, i.e. it is considered preferable that the horizontal component of transport speed be as close as practical to the speed of the boat relative to the water. Under this condition, there is little if any relative movement between the transport flight 12 and the floatage-bearing water adjacent it. However, the invention can be practiced with a transport speed faster and, alternatively, slower than the craft travel. By way of illustrative example, a transport speed between 0.5 foot/second and 5 feet/second can be used in recovering floatage such as oil and oil-sorbents with equipment as shown in FIGS. 1 and 2.

At any point along the transport flight 12, the inner sidewall of the hull floats 20 and 22 extend deeper into the water than the flight, and aft of the location 42 they extend deeper than the flight at that location. The portions of the float sidewalls thus depending below the flight 12 block floatage being carried along the flight from flowing or otherwise moving laterally, i.e., sideways, out from under the transport and hence "escaping" from under the flight. Instead, the depending float sidewalls channel the floatage to remain under the transport lower flight.

At the lower location 42, where the lower flight of the materials transport ends and the transport begins to move upward, the trapped floatage is no longer depressed further into the water, but rather is released and allowed to rise due to its buoyancy. As FIG. 1 indicates, much of the floatage enters the well at the opening 54 in front of the baffle. Other increments of floatage are carried aft with the water current as they rise, and enter the well through the baffle. The baffle thus provides the well with a large open bottom area through which floatage can enter the well, thereby increasing the proportion of floatage "trapped" by the conveyor which collects in the well. The opening 54, which can be considered part of the baffle, is made large enough to allow large pieces of solid floatage, typically wood, to enter the well. The floatage that enters the collecting well 18 rises to the top of the water in the well. As indicated above, water displaced by floatage entering the well passes out of it through the baffle 56.

The baffle suppresses turbulent water flow which might draw floatage out of the well. The illustrated baffle is a honeycomb grid of upstanding or on-edge strips. Other constructions and designs can be used for the baffle, the purpose of it being to allow floatage to enter the well and to allow water to flow into and out of the well 18, depending on the height of the column of collected floatage therein, and further to suppress water currents that would tend to draw collected floatage out of the well. By way of further example, the baffle can have strips such as those illustrated but extending only in the single direction transverse to the craft direction of travel, and other constructions will suggest themselves to those having conventional skill in the art. Further, the baffle openings can progressively decrease in size along the span of the baffle aftward from the location 42. A baffle as illustrated in FIGS. 1 and 2 preferably is constructed with openings of between 2 and 8 inches along each side and with a baffle height between one and three times this dimension.

As noted above, the floatage which the craft 10 of FIGS. 1 and 2 can collect includes both solid and liquid materials, including oil, oil-sorbents, and a wide variety of other floating liquid and solid materials. The scraper 50 removes whatever floatage adheres or otherwise sticks to the belt transport 12 after it has passed upward from the lower roller 30 and before it passes around the drive roller 32. The material which the scraper thus removes from the transport remains collected in the well 18.

Figure 3:
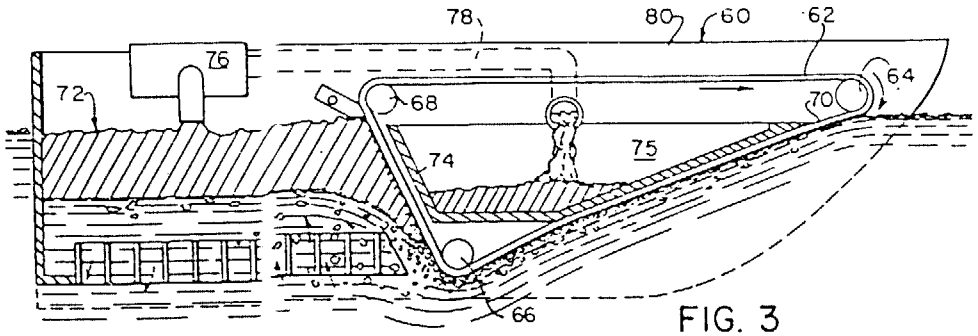
FIG. 3 is a simplified view similar to FIG. 1 of a floatage recovering and collecting craft embodying further features of the invention.

FIG. 3 is a view of a floatage recovery craft 60 similar to the view shown in FIG. 1 of the boat 10. In the craft 60, a belt transport 62 is trained on three rollers 64, 66 and 68 to provide a lower flight 70 similar to the flight 12 of FIG. 1. However, the roller 68 is located well above the lower roller 66 and the water line. This arrangement forms the entire front wall of the collecting well 72 with the transport length between rollers 66 and 68. Further, the craft 60 has a mid-ship structure 74 which forms a storage tank 75 for collected floatage. A pump 76 transfers floatage from the collection well 72 to the tank 75, by way of a pipe 78 which can pass by the belt transport 62 within one hull float 80, as indicated.

Figure 4:
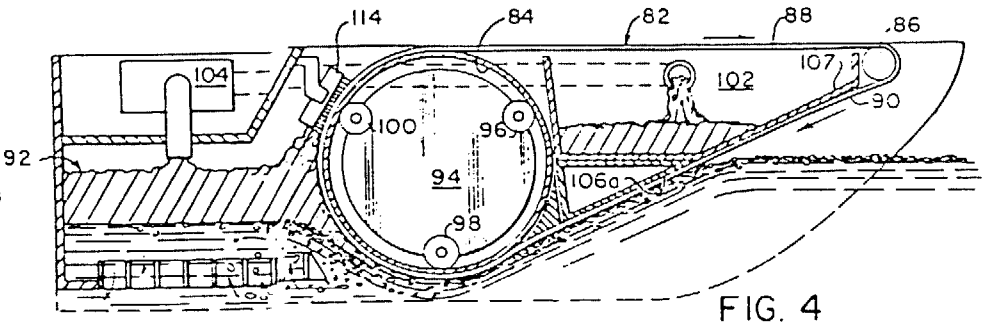
FIG. 4 is a side elevation view of another floatage recovering and collecting vessel embodying the invention.

FIG. 4 shows another floatage recovering craft 82 in which a large drum 84, in conjunction with a forward roller 86, drives and positions a belt transport 88 to provide a moving and downwardly-inclined belt flight 90 which carries floatage to a collecting well 92. A stationary drum 94, typically containing fuel, ballast, or equipment for the craft 82, carries three rotatable wheel rollers 96, 98 and 100, that mount the transport-supporting drum 84 for rotation relative to the inner drum 94. One wheel roller is driven to drive the drum 84 and hence the transport 88. Another like set of three wheel rollers (not shown) is mounted on the stationary drum structure 94 and supports the drum 84 at a position axially-spaced from the set of wheel rollers 96, 98 and 100 shown. A storage tank 102 forward of the roller 84 and between the upper and lower flights of the belt transport 88 receives excess collected floatage from the well 92 by way of a pump 104.

The FIG. 4 craft 82 further has a platform 106 providing a continuous backup surface 106a for the belt transport plate 90 between the rollers 86 and the drum 84. The surface 106a lies substantially along the construction line tangent to both the drum 84 and roller 86 lower surfaces. The cylindrical surface of the drum 84 and the planar surface 106a thus form a substantially continuous surface extending behind the full length of the belt transport engagement with floatage. Where this surface is impervious to the materials being recovered, the belt transport can have an open construction, rather than the continuous, substantially floatage impervious construction shown in FIG. 2.

Figure 5A:
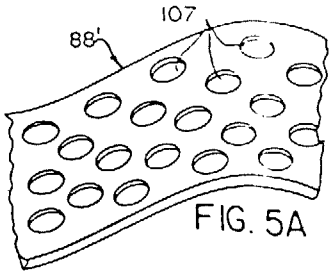
FIGS. 5A and 5B are fragmentary perspective views showing different forms of materials transports and rollers for use in practicing the invention.
Figure 5B:
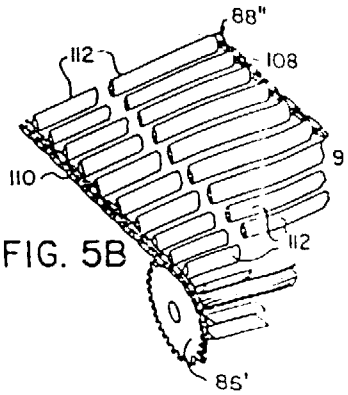

FIGS. 5A and 5B illustrate open constructions for the belt transport 88. In FIG. 5A, the belt transport 88' is perforated with holes 107. The sidewalls of the holes increase the engagement of the transport with some types of floatage, and hence enhance the movement of such floatage down the flight 90 (FIG. 4) to the collecting well 92.

FIG. 5B illustrates another form of open construction belt transport for use in practicing the invention. This belt transport 88" is constructed with two endless chains 108 and 110 at the peripheral edges of the transport and interconnected with paddle members 112, in a manner similar to the construction of a belt conveyor. This paddle construction for the belt transport 88" can be cleaned free of adhering floatage by means of a brush 114, shown in FIG. 4. Either a stationary brush or a rotating one, with the direction of rotation preferably being opposite to that of the drum 84, can be used. Such a brush can, of course, also be used to clean other types of belt transports as shown in FIGS. 2 and 5A.

Further, the belt transport 88" is supported and driven on the roller 86 and drum 84 (FIG. 4) by means of sprocket wheels 116 shown in FIG. 5B mounted on the roller or drum, as the case may be. In fact, with this construction of the belt transport 88", the roller 86 can simply have the form of two rotatable sprocket wheels; no cylindrical surface is required. The term "roller" is used herein in a broad sense to include these and other rotatable belt-transport guides and driving wheel members.

Alternative to mounting the materials transport and collecting well on a boat or other craft as illustrated in the Figures, other structures can be used for deploying it. For example, a materials transport embodying the invention can be mounted by way of booms or other outrigging from a boat to provide the downwardly inclined lower flight described above in front of a floatage-collecting well.

Figure 6:
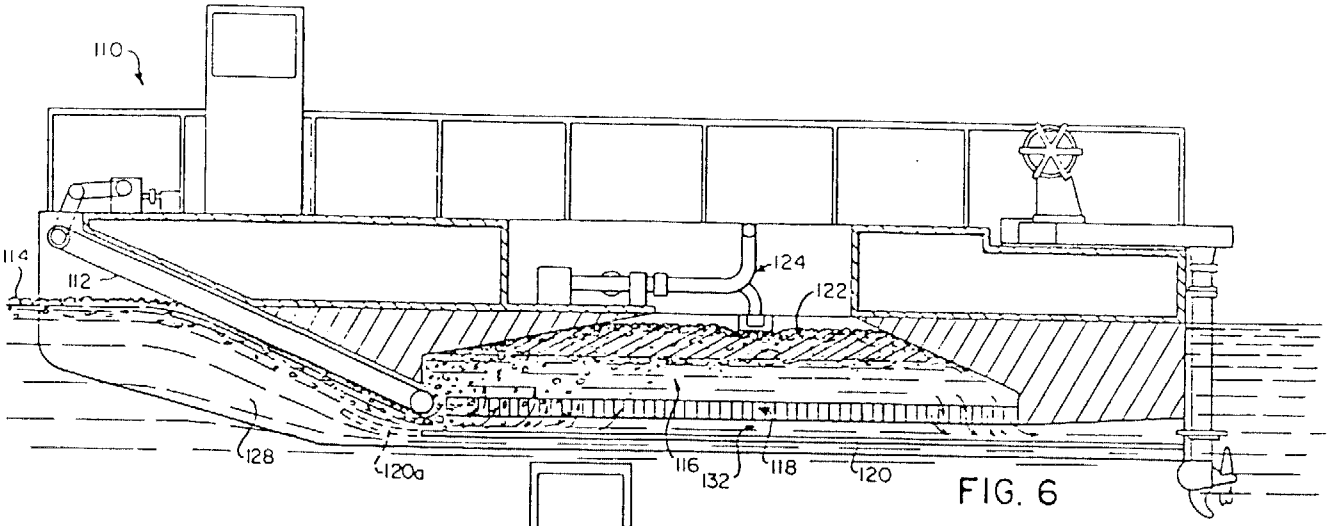
FIGS. 6 and 7 are, respectively, side elevation and front elevation views, partly broken away, of a surface craft embodying further features of the invention.
Figure 7:
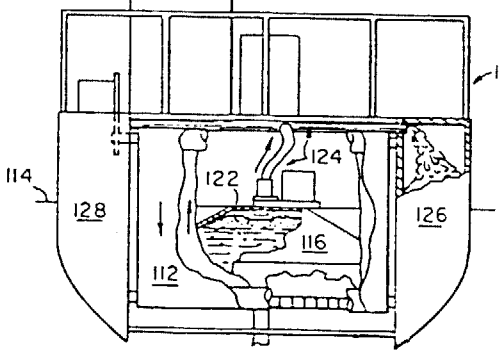

Turning to FIGS. 6 and 7, they show a further floatage-collecting craft 110 according to the invention. As with the embodiments of FIGS. 1–4, the craft 110 has a forwardly-facing declining belt transport 112 that feeds floatage [front] *from* the water surface 114 downward below the surface and discharges it for entry into a collection well 116. The lowest end of the transport 112 lower flight is spaced forward of, and at the same level as, a baffle 118 spanning across the bottom of the well to curtail currents from drawing floatage downward and out of the well.

The craft 110 has two features not shown in FIGS. 1–4. One is the provision of a bottom plate 120 spaced below the baffle 118, and the other is the provision of an overall funnel shape to the collection well 116.

The funnel-like geometry of the collection well channels the floatage in the well to a relatively small pocket 122 at the well top. A pumping system 124 draws the pumpable floatage out of the well at the pocket to storage tanks, typically located in the craft hull. This arrangement diminishes the likelihood that the pumping system will pick up water from the well, even in relatively rough waters. Correspondingly it diminishes the volume of floatage that must be in the well to preclude picking up water when pumping out the floatage.

More particularly, as seen in FIGS. 6 and 7, the horizontal cross-sectional area of the funneling collection well 116 is smallest at the well top and [larges] *largest* at the well bottom. The horizontal cross-sectional area of the well preferably diminishes progressively with height at least along the upper portion of the well to form the funnelling construction. However, it is not necessary that the well sidewalls taper inwardly in a symmetrical fashion, for the funnel shape does not need to be symmetrical in order to realize the foregoing advantages.

With further reference to FIGS. 6 and 7, the bottom plate 120 is provided for the purpose of preventing turbulent and other currents which the baffle 118 may not suppress from interfering with the collection of floatage. Specifically, such currents can reduce the proportion of floatage that enters the well, and they can carry floatage out of the well through the baffle. Also, the baffle 118 and the bottom plate 120, which in effect is a further baffle, diminish turbulence within the well with the result that a high degree of gravity separation between collected floatage and water takes place in the well.

The plate 120 can be either impervious to water, e.g., of sheet metal, or pervious so long as it blocks currents. The plate preferably spans the craft width between its twin hulls 126 and 128, and extends at least along the length of the well bottom. Further, it is considered preferable to extend the plate to the stern of the craft, as illustrated. It may be desirable to provide the plate 120 with a forward extension 120a in the manner shown in phantom in FIG. 6.

The illustrated plate 120 is planar from the front of the well 116 to the craft stern, and extends parallel to the water line 130 so as to be uniformly spaced below the flat bottom of the baffle 118. This construction provides a passage 132 between the plate and baffle of essentially uniform vertical cross section. Alternative constructions can however be used. One alternative is to arrange the plate and the craft surface above it in a manner to diverge from each other along the craft length. This forms the passage 132 with progressively increasing height along the craft length and may enhance the entry of floatage into the well, rather than being carried all the way along the passage.

The minimum spacing of the forward edge of the plate 120 below the transport and baffle is selected to allow at least substantially all floatage engaged below the transport to enter the passage 132. Generally the spacing is otherwise kept to a minimum and the plate at least is above the lower edge of the hulls 126 and 128. By way of illustrative guideline, the spacing typically is between 4inches and 12 inches in a craft of up to the order of 40 feet in length. To recover and transport floatage of different kinds and under different weather and water conditions, it may be desirable to mount the plate 120 for selective movement i.e., to raise or lower the plate, to draw it close to the baffle to effectively close the well bottom, and to change the angle of the plate relative to the craft 110.

The provision of the plate 120 further isolates the collection well 116 from currents that tend to interfere with the collection and retention of floatage. Specifically, the plate blocks currents directed sideways relative to the forward movement of the craft, such as can arise during maneuvering. The plate also is effective against currents that arise from forward motion of the craft 110, and from rolling and pitching of the craft in heavy seas. It is particularly desirable to isolate the well from heavy seas in this manner because, in contrast to prior floatage recovery equipment, the present invention can be used in heavy seas. This is because the invention recovers floatage by first submerging it, and this substantially isolates the floatage being collected from surface waves.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings shall be interpreted as illustrative and not in a limiting sense.

Having described the invention, what is claimed as new and secured by Letters Patent is:

1. Apparatus for skimming floating materials, *whether solid or liquid,* from the surface of a body of water and collecting the same comprising, in combination A. a first roller having a longitudinal axis of rotation, B. means positioning said first roller so that its axis of rotation is located above the surface of the body of water, C. a second roller, D. means positioning said second roller so that its longitudinal axis of rotation is parallel to the first roller and horizontally spaced therefrom, at least a portion of said second roller surface being below the surface of the body of water and the lower horizontal tangent of said second roller being below the lower horizontal tangent of said first roller, E. endless-*belt* material transport means carried by said rollers, F. means for driving at least one of said rollers in a direction so that the lower flight of said material transport means moves downwardly from said first roller to said second roller, G. means forming a materials collecting and retaining well, said well 1. having a bottom opening and an enclosed periphery formed by sidewalls extending from above said surface to below it, said sidewalls which extend transversely to the horizontal spacing between said rollers extending downwardly substantially only to the level of said lower horizontal tangent of said second roller, 2. having said bottom opening disposed aft of said second roller and extending along the length of said well for the passage therethrough of said material and of water, and H. perforated baffle means horizontally disposed at least partially spanning said well bottom opening substantially at said level of said lower horizontal tangent of said second roller, for passing said material into said well and for blocking the flow of turbulent currents into said well through said bottom opening, whereby said transport means removes floating material from the surface of the water downwardly toward said second roller, and discharges said material below the water surface for the entry thereof into said well through said opening and at least in part through said baffle means.

2. In apparatus for removing [at least liquid] floatage, *whether solid or liquid,* from the surface of a body of liquid, and having 1. means forming an endless-*belt* materials transport, 2. transport-mounting means disposing said transport to have an upper flight thereof above a lower flight thereof and with said flights extending between first and second horizontally-spaced locations, said lower flight being inclined downwardly along the passage thereof from said first location to said second location, 3. drive means for advancing said transport to move said lower flight in the direction from said first location to said second location, 4. support means for deploying said transport with said lower flight above the surface of said liquid body at said first location and submerged below said surface at said second location, and 5. a floatage-collecting well mounted with said support means adjacent the side of said second location away from said first location, said well having means forming peripheral walls extending vertically from above said surface downwardly to at least below said surface, the improvement wherein

*A.* said well *is arranged to have no significant pressure head at the surface of liquid therein and* has an opening thereinto at the bottom thereof disposed no lower than the level of said transport at said second location and located beyond said second location from said first location, said opening extending along said direction of transport lower flight advance and communicating with said materials transport at said second location for the passage therethrough of [liquid] floatage buoyantly rising after discharge from below said lower flight[.],

*B. said transport, said mounting means, said drive means and said support means are together arranged for*

*i. engaging floatage under said transport lower flight,*

*ii. submerging at least a significant portion of said engaged floatage and drawing it thereunder, by advancement of said apparatus relative to said liquid and by said transport advance, to said second location without significant adhesion to said transport, and*

*iii. discharging submerged floatage from under said lower flight at said second location for buoyantly rising into said collection well through said bottom opening thereof.*

3. In apparatus as defined in claim 2, the further improvement wherein said transport-mounting means includes means for disposing said transport with said lower flight thereof inclined from the horizontal by an angle substantially between 10° and 35°.

4. In apparatus as defined in claim 2 the further improvement comprising pump means for removing from within said well [said] liquid floatage which is floating on said surface.

5. In apparatus as defined in claim 2 the further improvement wherein said peripheral walls of said collection well include first walls extending longitudinal to said transport and second walls extending transversely to said transport, and said transversely-extending walls extend vertically downward to a level no lower than the level of said transport lower flight at said second location.

6. In apparatus as defined in claim 2 the further improvement wherein said well has a floatage-concentrating funnel-like configuration with the smallest horizontal cross-sectional area at the top thereof.

7. In apparatus as defined in claim 6, the further improvement comprising pump means communicating with said well at the funnel-like configuration thereof for pumping at least flowable floatage out from said well.

[8. In apparatus for removing at least liquid floatage from the surface of a body of liquid, and having 1. means forming an endless materials transport, 2. transport-mounting means disposing said transport to have an upper flight thereof above a lower flight thereof and with said flights extending between first and second horizontally-spaced locations, said lower flight being inclined downwardly along the passage thereof from said first location to said second location, 3. drive means for advancing said transport to move said lower flight in the direction from said first location to said second location, 4. support means for deploying said transport with said lower flight above the surface of said liquid body at said first location and submerged below said surface at said second location, and 5. a floatage-collecting well mounted with said support means adjacent the side of said second location away from said first location, said well having means forming peripheral walls extending vertically from above said surface downwardly to at least below said surface, the improvement wherein A. said well has a bottom opening substantially at the level of said second location and located beyond said second location from said first location, said opening extending along said direction of conveyor lower flight advance and communicating with said materials transport at said second location for the passage therethrough of liquid floatage buoyantly rising after discharge from below said lower flight, and said well retains liquid floatage therein from said body of liquid, and B. said transport, said mounting means, said drive means and said support means are together arranged for i. engaging said liquid floatage under said transport lower flight, ii. submerging at least a significant portion of said engaged liquid floatage and drawing it thereunder to said second location without significant adhesion to said transport, and iii. discharging said portion of submerged liquid floatage from under said lower flight at said second location for buoyantly rising into said collection well through said bottom opening thereof.]

[9. In apparatus as defined in claim 8, the further improvement comprising horizontally-disposed and perforate baffle means spanning said bottom opening of said well at a level no lower than said transport at said second location, and arranged for the passage of said floatage therethrough and for impeding turbulent floatage-removing flow of the liquid of said body through said opening.]

10. In apparatus as defined in claim [9] *28*, the further improvement wherein said perforate baffle means has a lower substantially horizontal face disposed at a first level which is no lower than the level of said transport lower flight at said second location.

11. In apparatus for removing floating material, [including at least liquid floatage] *whether solid or liquid*, from the surface of a body of liquid, and having 1. means forming an endless *-belt* materials transport, 2. transport-mounting means disposing said transport to have an upper flight thereof above a lower flight thereof and with said flights extending between first and second horizontally-spaced locations, said lower flight being inclined downwardly along the passage thereof from said first location to said second location, 3. drive means for advancing said transport to move said lower flight in the direction from said first location to said second location, 4. support means for deploying said transport with said lower flight above the surface of said liquid body at said first location and submerged below said surface at said second location, and 5. a floatage-collecting well mounted with said support means adjacent the side of said second location away from said first location, said well having means forming peripheral walls extending vertically from above said surface downwardly to at least below said surface, the improvement wherein A. said well has a bottom opening located beyond said second location from said first location and extending along the length of said well in the direction of [conveyor] lower flight advance, said opening communicating with said materials transport for the passage therethrough of floatage buoyantly rising after discharge from below said lower flight, B. said opening into said well includes a floatage-passing perforate baffle impeding turbulent flow of liquid through said opening, and C. said well is arranged to retain [said] discharged liquid floatage therein from loss to said body of liquid.

12. In apparatus as defined in claim 11 the further improvement wherein said baffle has a lower substantially horizontal face disposed at the level of said lower flight at said second location.

13. In apparatus as defined in claim 11 the further improvement comprising a horizontally-arranged member spaced below said baffle and below the level of said transport at said second location, for shielding said well opening from currents in said body of liquid.

14. In apparatus for removing floatage, *whether solid or liquid,* from the surface of a body of liquid, and having 1. means forming an endless-*belt* materials transport, 2. transport-mounting means disposing said transport to have an upper flight thereof above a lower flight thereof and with said flights extending between first and second horizontally-spaced locations, said lower flight being inclined downwardly along the passage thereof from said first location to said second location, 3. drive means for advancing said transport to move said lower flight in the direction from said first location to said second location, 4. support means for deploying said transport with said lower flight above the surface of said liquid body at said first location and submerged below said surface at said second location, and 5. a floatage-collecting well mounted with said support means adjacent the side of said second location away from said first location, said well having means forming peripheral walls extending vertically from above said surface downwardly to at least below said surface, the improvement wherein A. said peripheral walls of said well which extend transversely to said horizontal spacing between said locations extend downwardly substantially only to the level of said second location, B. said well *is arranged to have no significant pressure head at the surface of liquid therein and* has a bottom opening thereinto located beyond said second location from said first location, said opening extending along the length of said well in said direction of transport lower flight advance and communicating with said materials transport for the passage therethrough of [liquid] floatage buoyantly rising after discharge from below said lower flight at said second location, and C. a plate-like member is horizontally disposed below the level of said transport at said second location and is spaced beneath said well opening, and spans across at least said well opening for admitting floatage to pass thereabove and for shielding said well opening from currents in said body of liquid.

15. In apparatus for removing floating material [including liquid floatage], *whether solid or liquid,* from a body of liquid and having a downwardly-inclined *endless-belt* materials transport with a horizontally-extending lower flight passing between a first location above the surface of said liquid to a second location below said surface and horizontally spaced from said first location, the improvement comprising A. *a* floatage-collecting well i. *open at the top to the pressure of the atmosphere so that no significant pressure head develops at the surface of liquid in the well and* having an open bottom formed by peripheral walls including first wall means extending longitudinal to said transport and second wall means extending transversely to said transport, said transversely-extending wall means extending vertically from above said surface downwardly to no lower than said lower flight at said second location, and said longitudinally-extending wall means extending vertically from above said surface downwardly to at least the level of said lower flight at said second location, ii. said bottom opening being located contiguously beyond said second location on the side thereof away from said first location and extending along the length of said well longitudinal to said transport, so that floatage, including [said] liquid floatage, moves along said transport lower flight to said second location and passes from said second location in the direction toward said opening for buoyantly rising into said well through said opening, and B. first perforate baffle means horizontally disposed at said well opening, whereby said baffle impedes the passage through said opening of turbulently-flowing liquid of said body and allows floatage to pass therethrough from said second location and allows liquid of said body displaced from said well by floatage therein to pass outward from said well.

16. In apparatus as defined in claim 15, the further improvement wherein said first baffle means has a lower face at the level of said transport lower flight at said second location.

17. In apparatus as defined in claim 15, the further improvement comprising a horizontally arranged member for blocking from said well opening turbulent currents which are directed transversely to the spacing between said locations and to the spacing between said longitudinally-extending wall means, said member spanning said well opening and located below said first baffle means and below the level of said transport lower flight at said second location by a distance sufficient to allow floatage to pass from below said second location to above said member.

18. A method for collecting [liquid] floatage, *whether solid or liquid,* from a body of liquid, said method comprising the steps of A. submerging said floatage under a downwardly-inclined *endless-belt* conveyor surface having a forward end *without significant adhesion to said transport* above the surface of said body of liquid and having a back end below said liquid surface and which advances from said forward end to said back end and advances relative to said liquid, thereby to draw floatage from the liquid surface downward under said conveyor surface toward said back end, B. releasing the submerged [liquid] floatage from under said conveyor surface at said back end [into] *for buoyantly rising therefrom in* said liquid, and C. collecting said released floatage, upon the buoyant rise thereof, within a vertically-extending, liquid-retaining enclosure having a floatage-passing bottom opening extending from adjacent said back end of said conveyor surface along said enclosure in the direction of said conveyor surface advance[.] *without developing a significant pressure head at the surface of liquid in the collecting enclosure.*

19. The method defined in claim 18 comprising the further step of impeding the flow of currents of said liquid body into said enclosure through said opening and concurrently allowing said floatage and liquid to pass therethrough.

20. The method defined in claim 18 comprising the further steps of

A. baffling said enclosure bottom opening to impede the flow of currents of said liquid body therethrough, and B. isolating said enclosure bottom from currents of said liquid body that are directed horizontally transversely to the spacing between said ends of said conveyor surface.

21. A method for collecting [both solid and liquid] floatage, *whether solid or liquid,* from a body of liquid, said method comprising the steps of A. engaging the floatage under a horizontally-extending and downwardly-inclined *endless-belt* conveyor surface having a forward end above the surface of said body of liquid and having a back end below said liquid surface, B. *advancing said conveyor relative to the liquid of said body and* advancing said conveyor surface in the direction from said forward end to said back end, and at a rate to diminish relative movement between said liquid and said conveyor *for drawing at least a portion of the floatage engaged under said conveyor surface to said back end thereof without significant adhesion to said conveyor* surface, C. locating a collection well at said back end of said conveyor surface, D. providing said well with at least a partially open bottom located at a depth below said surface of said liquid and not below said conveyor surface at said back end thereof, E. extending said bottom opening from adjacent said back end of said conveyor surface backwardly along said well in the direction of advance of said conveyor surface, F. discharging collected floatage, including liquid floatage, from under said conveyor surface at said back end for buoyantly rising into said collection well through said open bottom thereof *without developing a significant pressure head at the surface of liquid in the collection well as it fills with floatage,* and G. retaining said discharge floatage in said well from loss to said body of liquid.

22. The method defined in claim 21 comprising the further step of baffling currents of said liquid body from communicating through said open bottom of said collection well with liquid within said collection well by spanning across at least part of said well opening with a horizontally-extending liquid-baffling member.

*23. In apparatus as defined in claim 2, the further improvement comprising horizontally extending means spanning said well opening for blocking from said well turbulent currents which are directed transversely to the spacing between said locations and to the spacing between said longitudinally-extending wall means.*

*24. In apparatus for removing floating material, whether solid or liquid, from the surface of a body of liquid, and having*

*1. means forming an endless-belt materials transport,*

*2. transport-mounting means disposing said transport to have an upper flight thereof above a lower flight thereof and with said flights extending between first and second horizontally-spaced locations, said lower flight being inclined downwardly along the passage thereof from said first location to said second location,*

*3. drive means for advancing said transport to move said lower flight in the direction from said first location to said second location,*

*4. support means for deploying said transport with said lower flight above the surface of said liquid body at said first location and submerged below said surface at said second location, and*

*5. a floatage-collecting well mounted with said support means adjacent the side of said second location away from said first location, said well having means forming peripheral walls extending vertically from above said surface downwardly to at least below said surface,*

*the improvement wherein*

*A. said well is open at the top to atmospheric pressure for having no significant pressure head at the surface of liquid therein,*

*B. said well has a bottom opening located beyond said second location from said first location and extending along the length of said well in the direction of conveyor lower flight advance, said opening communicating with said materials transport for the passage therethrough of floatage buoyantly rising after discharge from below said lower flight,*

*C. said bottom opening into said well includes a floatage-passing baffle impeding turbulent flow of liquid through said opening, and*

*D. said well is arranged to retain discharged liquid floatage therein from loss to said body of liquid.*

*25. Apparatus for removing floatage, whether solid or liquid, from the surface of a body of water and collecting the same comprising*

*A. means forming an endless-belt materials transport,*

*B. transport-mounting means disposing said transport to have an upper flight thereof above a lower flight thereof and with said flights extending between first and second horizontally-spaced locations, said lower flight being inclined downwardly along the passage thereof from said first location to said second location,*

*C. drive means for advancing said transport to move said lower flight in the direction from said first location to said second location,*

*D. support means for deploying said transport with said lower flight above the surface of said liquid body at said first location and submerged below said surface at said second location,*

*E. a floatage-collecting and retaining well mounted with said support means adjacent the side of said second location away from said first location, said well having means forming peripheral walls extending vertically from above said surface downwardly to at least below said surface, said well being open at the top to the pressure of the atmosphere for being free of significant pressure head at the surface of liquid therein and having an opening thereinto at the bottom thereof disposed no lower than the level of said transport at said second location and located beyond said second location from said first location, said opening extending along said direction of transport lower flight advance and communicating with said materials transport at said second location for the passage therethrough of floatage buoyantly rising after discharge from below said lower flight, and*

*F. a horizontally arranged member spanning said well opening for blocking from said well opening turbulent currents which are directed transversely to the spacing between said locations and to the spacing between said longitudinally-extending wall means.*

*26. In apparatus for removing floatage, whether solid or liquid, from the surface of a body of liquid, and having*

*1. means forming an endless-belt materials transport,*

*2. transport-mounting means disposing said transport to have a lower flight extending between first and second horizontally-spaced locations, said lower flight being inclined downwardly along the passage thereof from said first location to said second location,*

*3. drive means for advancing said transport to move said lower flight in the direction from said first location to said second location,*

*4. support means for deploying said transport with said lower flight above the surface of said liquid body at said first location and submerged below said surface at said second location, and*

*5. a floatage-collecting well mounted with said support means adjacent the side of said second location away from said first location, said well having means forming peripheral walls extending vertically from above said surface downwardly to at least below said surface,*

*the improvement wherein*

*A. said well is open at the top to the pressure of the atmosphere for being free of significant pressure head at the surface of liquid therein, and has a bottom opening substantially at the level of said second location and located beyond said second location from said first location, said opening extending along said direction of transport lower flight advance and communicating with said transport at said second location for the passage therethrough of floatage buoyantly rising after discharge from below said lower flight, and said well retains floatage, including liquid floatage, therein from said body of liquid,*

*B. said transport, said mounting means, said drive means and said support means are together arranged for*

*i. engaging floatage under said transport lower flight,*

*ii. submerging at least a significant portion of said engaged floatage and drawing it thereunder, by advancement of said apparatus relative to the liquid of said body and by said transport advance, to said second location without significant adhesion to said transport, and*

*iii. discharging submerged floatage from under said lower flight at said second location for buoyantly rising into said collection well through said bottom opening thereof, and*

*C. horizontally-disposed and perforate baffle means is provided spanning said bottom opening of said well at a level no lower than said transport at said second location, and arranged for the passage of said floatage therethrough and for impeding turbulent floatage-removing flow of the liquid of said body through said opening.*

*27. In apparatus for removing floatage, whether solid or liquid, from the surface of a body of water, and having*

*1. an endless-belt materials transport,*

*2. transport-mounting means disposing said transport to have a lower flight extending between first and second horizontally-spaced locations, said lower flight being inclined downwardly along the passage thereof from said first location to said second location,*

*3. drive means for advancing said transport to move said lower flight in the direction from said first location to said second location,*

*4. support means for deploying said transport with said lower flight above the surface of the water at said first location and submerged below said surface at said second location and*

*5. a floatage-collecting well mounted with said support means adjacent the side of said second location away from said first location, said well having means forming peripheral walls extending vertically from above said surface downwardly below said surface,*

*the improvement wherein*

*A. said transport is arranged, upon advance of said apparatus relative to the water and said advance of the transport lower flight, for drawing at least a significant portion of floatage which it engages in its underside downwardly to the second location without adhesion thereof to the transport and for releasing such floatage at the second location to rise buoyantly free of the transport,*

*B. said well has a longitudinally-extending bottom opening, is arranged for receiving floatage which rises from below said transport at the second location and for retaining such floatage from loss to the body of water, and is arranged to have substantially no pressure head at the surface of liquid therein, and*

*C. a baffling member extending rearwardly from adjacent said back location is provided spanning the well bottom opening for retarding currents of water from interfering with the entry of floatage into the well and from carrying floatage outward from the well through said bottom opening,*

*whereby said transport submerges floatage which it engages at its underside and releases it at the second location for retention in said well with relatively high independence both from waves on the body of water and from currents of the water relative to the apparatus including currents due to maneuvering of the apparatus on the body of water.*

*28. In apparatus according to claim 27, the further improvement wherein said baffling member is a plate-like member spaced below the transport at the second location and below the well bottom opening by a minimal distance which allows substantially all floatage engaged below the transport to pass thereabove, said plate-like member providing a passage thereabove and below the well opening and into which floatage enters from below the transport.*

*29. In apparatus according to claim 27, the further improvement wherein the means for driving the materials transport comprises means for advancing the transport at a rate to diminish relative horizontal movement between the water and the transport lower flight.*

* * * * *

UNITED STATES PATENT AND TRADEMARK OFFICE

CERTIFICATE OF CORRECTION

PATENT NO. : Re. 30,729

DATED : September 1, 1981

INVENTOR(S) : James H. Farrell et al.

It is certified that error appears in the above-identified patent and that said Letters Patent is hereby corrected as shown below:

Column 11, line 55, change "claim 28" to --claim 26--.

Column 12, line 20, insert --transport-- before "[conveyor]".

Column 14, lines 8 through 10, after "having a forward end" delete "without significant adhesion to said transport".

Column 14, line 16, after "said back end" insert --without significant adhesion to said transport--.

Column 14, line 55, after "said conveyor" insert --surface--.

UNITED STATES PATENT AND TRADEMARK OFFICE

CERTIFICATE OF CORRECTION

PATENT NO. : Re. 30,729

DATED : September 1, 1981

INVENTOR(S) : James H. Farrell et al.

It is certified that error appears in the above-identified patent and that said Letters Patent is hereby corrected as shown below:

Column 14, line 58, after "to said conveyor" delete "surface".

Signed and Sealed this

*Fourth* Day of *December 1984*

[SEAL]

*Attest:*

GERALD J. MOSSINGHOFF

*Attesting Officer*

*Commissioner of Patents and Trademarks*